United States Patent
Devassy et al.

(10) Patent No.: US 7,409,509 B2
(45) Date of Patent: *Aug. 5, 2008

(54) DYNAMIC STORAGE DEVICE POOLING IN A COMPUTER SYSTEM

(75) Inventors: Varghese Devassy, Winnipeg (CA); Raji Kottomtharayil, Ocean, NJ (US); Manoj Kumar Vijayan Retnamma, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/582,152

(22) Filed: Oct. 17, 2006

(65) Prior Publication Data

US 2007/0130430 A1    Jun. 7, 2007

Related U.S. Application Data (63) Continuation of application No. 10/658,095, filed on Sep. 9, 2003, now Pat. No. 7,130,970.

(60) Provisional application No. 60/409,183, filed on Sep. 9, 2002.

(51) Int. Cl.
      *G06F 12/00*   (2006.01)
(52) U.S. Cl. .................... 711/154; 711/4; 711/100; 711/111; 711/151; 711/158; 711/162
(58) Field of Classification Search ............... 711/154, 711/4, 100, 111, 151, 158, 162
      See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |

(Continued)

FOREIGN PATENT DOCUMENTS

EP    0 259 912    3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Stephen C Elmore
(74) *Attorney, Agent, or Firm*—Knobbe, Martens, Olson & Bear, LLP (57) ABSTRACT

A method for dynamically allocating control of a storage device, the method comprising receiving an access request from a first computer requesting access to a storage device; directing, based upon the access request, a first storage controller computer to assume an inactive state with respect to control of the storage device; and directing, based upon the access request, a second storage controller computer to assume an active state with respect to control of the storage device.

13 Claims, 4 Drawing Sheets

U.S. PATENT DOCUMENTS

| | | |
|---|---|---|
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,388,243 A | 2/1995 | Glider et al. |
| 5,410,700 A | 4/1995 | Fecteau et al. |
| 5,448,724 A | 9/1995 | Hayashi |
| 5,465,359 A | 11/1995 | Allen et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,295,541 B1 | 9/2001 | Bodnar |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Carteau |
| 6,330,572 B1 | 12/2001 | Sitka |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,586 B1 | 8/2002 | Hass et al. |
| 6,487,561 B1 | 11/2002 | Ofek et al. |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,631,442 B1 | 10/2003 | Blumenau |
| 6,965,968 B1 | 11/2005 | Touboul et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,174,433 B2 | 2/2007 | Kottomtharayil et al. |
| 7,246,207 B2 | 7/2007 | Kottomtharayil et al. |
| 2002/0004883 A1 | 1/2002 | Nguyen et al. |
| 2002/0049803 A1 | 4/2002 | Bandhole et al. |
| 2003/0014607 A1 | 1/2003 | Slavin et al. |
| 2003/0061491 A1 | 3/2003 | Jaskiewicz et al. |
| 2003/0163652 A1 | 8/2003 | Tsuge |
| 2003/0225801 A1 | 12/2003 | Devarakonda et al. |
| 2004/0090788 A1 | 4/2004 | Kottomtharayil |
| 2004/0167941 A1 | 8/2004 | Prahlad et al. |
| 2005/0033756 A1 | 2/2005 | Kottomtharayil et al. |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| EP | 1 115 064 A3 | 12/2004 |
| GB | 2366048 | 2/2002 |
| WO | WO 95/13580 | 5/1995 |
| WO | WO 99/12098 | 3/1999 |
| WO | WO 99/17204 | 4/1999 |

OTHER PUBLICATIONS

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press vol. Conf. (Mar. 5, 1995), pp. 420-427.

Eitel, "Backup and Storage Management in Distributed Heterogeneous Environments," *IEEE*, 1994, pp. 124-126.

Farley, "Building Storage Networks," pp. 328-331, Osborne/McGraw-Hill, 2000.

Gibson et al., "Network Attached Storage Architecture," pp. 37-45, ACM, Nov. 2000.

Jander, M., "Launching Storage-Area Net" *Data Communications*, US, McGraw Hill, NY, vol. 27, No. 4(Mar. 21, 1998), pp. 64-72.

Rosenblum et al., "The Design and Implementation of a Log-Structure File System, " *Operating Systems Review SIGOPS*, vol. 25, No. 5, New York, US, pp. 1-15 (May 1991).

Jason Gait, "The Optical File Cabinet: A Random-Access File System For Write-Once Optical Disks," *IEEE Computer*, vol. 21, No. 6, pp. 11-22 (1998).

DYNAMIC STORAGE DEVICE POOLING IN A COMPUTER SYSTEM

CROSS-REFERENCE TO RELATED APPLICATIONS

The present application is a continuation of U.S. patent application Ser. No. 10/658,095, filed Sep. 9, 2003, now U.S. Pat. No. 7,130,970, issued Oct. 31, 2006, which claims the benefit of priority under 35 U.S.C. § 119(e) from U.S. Provisional Patent Application No. 60/409,183, titled DYNAMIC STORAGE DEVICE POOLING IN A COMPUTER SYSTEM, filed Sep. 9, 2002, each of which is hereby incorporated herein by reference in its entirety.

This application is also related to the following pending applications, each of which is hereby incorporated herein by reference in its entirety:

- U.S. patent application Ser. No. 09/610,738, titled MODULAR BACKUP AND RETRIEVAL SYSTEM USED IN CONJUNCTION WITH A STORAGE AREA NETWORK, filed Jul. 6, 2000, now U.S. Pat. No. 7,035,880, issued Apr. 25, 2006;
- U.S. patent application Ser. No. 09/609,977, titled MODULAR BACKUP AND RETRIEVAL SYSTEM WITH AN INTEGRATED STORAGE AREA FILING SYSTEM, filed Aug. 5, 2000;
- U.S. patent application Ser. No. 09/354,058, titled HIERARCHICAL BACKUP AND RETRIEVAL SYSTEM, filed Jul. 15, 1999; and
- U.S. patent application Ser. No. 09/038,440, titled PIPELINED HIGH-SPEED DATA TRANSFER MECHANISM, filed Mar. 11, 1998, now U.S. Pat. No. 6,418,478, issued Jul. 9, 2002.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to data storage systems in computer networks and, more particularly, to improvements to storage systems which provide dynamic reallocation of storage device control.

There are many different computing architectures for storing electronic data. Individual computers typically store electronic data in volatile storage devices such as Random Access Memory (RAM) and one or more nonvolatile storage devices such as hard drives, tape drives, or optical disks, that form a part of or are directly connectable to the individual computer. In a network of computers such as a Local Area Network (LAN) or a Wide Area Network (WAN), storage of electronic data is typically accomplished via servers or stand-alone storage devices accessible via the network. These individual network storage devices may be networkable tape drives, optical libraries, Redundant Arrays of Inexpensive Disks (RAID), CD-ROM jukeboxes, and other devices. Common architectures include drive pools which serve as logical collections of storage drives with associated media groups which are the tapes or other storage media used by a given drive pool.

Stand-alone storage devices are connected to individual computers or a network of computers via serial, parallel, Small Computer System Interface (SCSI), or other cables. Each individual computer on the network controls the storage devices that are physically attached to that computer and may also access the storage devices of the other network computers to perform backups, transaction processing, file sharing, and other storage-related applications.

Network Attached Storage (NAS) is another storage architecture using stand-alone storage devices in a LAN or other such network. In NAS, a storage controller computer owns or controls a particular stand-alone storage device to the exclusion of other computers on the network, but the SCSI or other cabling directly connecting that storage device to the individual controller or owner computer is eliminated. Instead, storage devices are directly attached to the network itself.

A common feature shared by many or all existing network architectures is the static relationship between storage controller computers and storage devices. In existing network architectures, storage devices can each only be connected, virtually or physically, to a single storage controller computer. Only the storage controller computer to which a particular device is physically connected has read/write access to that device. A drive pool and its associated media group, for example, can only be controlled by the computer to which it is directly connected. Therefore, all backup from other storage controller computers needs to be sent via the network before it can be stored on the storage device connected to the first storage controller computer.

One problem associated with these storage architectures relates to overloading network traffic during certain operations associated with use of storage devices on the network. Network cables have a limited amount of bandwidth that must be shared among all the computers on the network. The capacity of most LAN or network cabling is measured in megabits per second (mbps), with 10 mbps and 100 mbps currently being standard. During common operations such as system backups, transaction processing, file copies, and other similar operations, network traffic often becomes overloaded as hundreds of megabytes (MB) and gigabytes (GB) of information are sent over the network to the associated storage devices. The capacity of the network computers to stream data over the network to the associated storage devices in this manner is greater than the bandwidth capacity of the cabling itself, thus substantially slowing ordinary network and storage activity and communications.

A Storage Area Network (SAN) is a network architecture designed to facilitate transport of electronic data and address this bandwidth issue. SAN architecture requires at least two networks. First, a traditional network described above such as a LAN transports ordinary traffic between networked computers. A SAN serves as a second network that is attached to the servers of the first network. The SAN is generally a separate network reserved for bandwidth-intensive operations such as backups, transaction processing, and the like. The cabling used in the SAN is usually of much higher bandwidth capacity than that used in the first network such as the LAN, and the communication protocols used over the SAN cabling are optimized for bandwidth-intensive traffic. The storage devices used by the networked computers for the bandwidth-intensive operations are attached to the SAN rather than the LAN. Thus, when the bandwidth-intensive operations are required, they take place over the SAN and the LAN remains unaffected.

Even with a SAN, however, the static relationship between individual storage controller computers and individual storage devices or drive pools causes bandwidth difficulties during data storage or retrieval operations. Under the current architectures, when a storage device is assigned to a storage controller computer, that storage controller computer owns and controls the device indefinitely and to the exclusion of other computers on the network. Thus, one computer on a network cannot control the drive pool and media group being controlled by another, and requests to store and retrieve data from such a drive pool and media group would have to first pass through the controlling computer. This relationship between storage controller computer and storage device continues to lead to bandwidth difficulties.

In addition, the current architectures result in inefficient use of resources and the need for extra storage devices or pools beyond the actual storage needs of the network. As an illustrative example, if each storage controller computer needs access to two storage devices and there are five storage controller computers in the network, then a total of ten storage devices will be required. The actual amount of work each of the ten storage devices performs might be much less than the workload capacity of each storage device.

There is thus a need for a method and system which addresses this inefficiency and the associated continued bandwidth problems.

SUMMARY OF THE INVENTION

The present invention addresses the problems discussed above, and includes a method for dynamically reallocating control of a storage device accessible via a computerized network. The method involves directing a first computer controlling the storage device to assume an inactive state with respect to the storage device and directing a second computer to assume an active state of control with respect to the storage device. The second computer may be selected to assume an active state of control based on a priority of a storage operation to be performed, on a manual selection of a user, or any other desired criteria. The method further involves storing control data indicating a change in control of the storage device. In accordance with some embodiments, the first computer demounts the storage device in response to the direction to assume an inactive state, and the second computer mounts the storage device in response to the direction to assume an active state.

In some embodiments, the first computer is identified as being in a state of control with respect to the storage device prior to sending direction to the first computer to assume an inactive state. This may be accomplished by retrieving previously stored control data with respect to the storage device which identifies the first computer as being in control. In accordance with some embodiments, if state data is received indicating unavailability of the second computer, a third computer is directed to assume an active state of control with respect to the storage device in lieu of the second computer.

In accordance with some embodiments, the second computer generates path data representing a network access path to the storage device. This path data is passed to a computer program requesting access to the storage device, and may further be stored in a database entry with the control data corresponding to the storage device.

The present invention further includes a system for managing a storage system comprising a plurality of storage devices which may be single drives or drive pools or a mix thereof. The system includes a plurality of storage controllers each capable of controlling the storage devices and a storage manager configured to receive a request to access a first storage device in the storage system and to send directions to activate one of the storage controllers with respect to the first storage device and deactivate other storage controllers with respect to the storage device. The system further includes a database stored in memory accessible to the storage manager for storing control data indicating a state of control over the first storage device.

In some embodiments, the storage controllers are capable of generating path data with respect to the first storage device and sending the path data to the storage manager. The database stores the path data received from the storage controller, and the storage manager passes the path data to a computer requesting access to the first storage device.

The present invention further includes methods and systems operating in conjunction with a SAN and a modular storage system to enable computers on a network to share storage devices on a physical and logical level. An exemplary modular storage system is the GALAXY backup and retrieval system available from CommVault Systems of New Jersey. The modular architecture underlying this system is described in the above referenced patent applications, incorporated herein. Each media agent or storage controller computer contains device management software (DMS) which can control storage devices on the network by communicating instructions from the media agent or storage controller computer to the storage devices. Dynamic device pooling can be achieved by controlling which DMS instance "owns" a storage device at a particular time. Although in a given network, there may be multiple DMS instances running on many MediaAgents or storage controller computers that are able to control a particular storage device, only one of those DMS instances is "active" with respect to a particular storage device and can control that device at any time. Accordingly, if a storage controller computer controlled a particular drive pool and media group, that computer could not directly store and retrieve data from drive pools and media groups controlled by other storage controller computers in a network. The CommServer or storage manager computer monitors and instructs the MediaAgents or storage controller computers regarding which MediaAgent's DMS controls a particular storage device at a given time.

In some embodiments, the CommServer or storage manager computer allocates control of a particular storage device by a MediaAgent or storage controller computer's DMS based on the priority of the storage operation to be performed.

In some embodiments, the storage administrator or user may also manually assign control of a particular storage device or devices to a MediaAgent or storage controller computer's DMS.

In some embodiments, the SAN may be a high-speed network topology with optimized storage transport protocols such the CommVault DataPipe™ described above.

In some embodiments, error recovery protocols exist such that if a particular storage controller computer or storage controller computer's DMS is unavailable, then the storage manager computer assigns control of a particular storage device to a different storage controller computer. Such reassignment by the storage manager computer creates a more fault-tolerant storage architecture and ensures that the malfunctioning or lack of availability of a particular storage controller computer or storage controller computer's DMS does not affect the other storage controller computers and their DMSs.

In some embodiments, an access path or logical network route to a particular storage device when that storage device is switched is obtained by the storage manager computer from the DMS currently in control of that storage device. The access path to a particular storage device is used by storage controller computers and their DMSs to contact that device and issue instructions regarding storage procedures. Obtaining the access path to the storage device from the DMS currently in control of the storage device in this manner is error free against any hardware changes to the storage controller computer or MediaAgent on which the DMS is running. Any hardware changes on a storage controller computer will involve reconfiguration of the storage controller computer and that DMS will either manually or automatically detect and reflect these changes. Storing the access paths to storage devices on the storage manager computer would be error prone in cases where the storage manager computer was unaware of changes made to storage controller computers and the resultant change in access paths to any affected storage devices.

In some embodiments, the access paths to storage devices could also be stored in a database or other data structure on the storage manager computer instead of being stored on the storage controller computers. Those skilled in the art will recognize that the DMS of the storage controller computer for a particular storage resource could either manually or automatically detect any hardware changes or other changes that would affect the access path to that storage resource and inform the storage manager computer of these changes. The storage manager computer would then update its record of the access path to that particular storage device.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
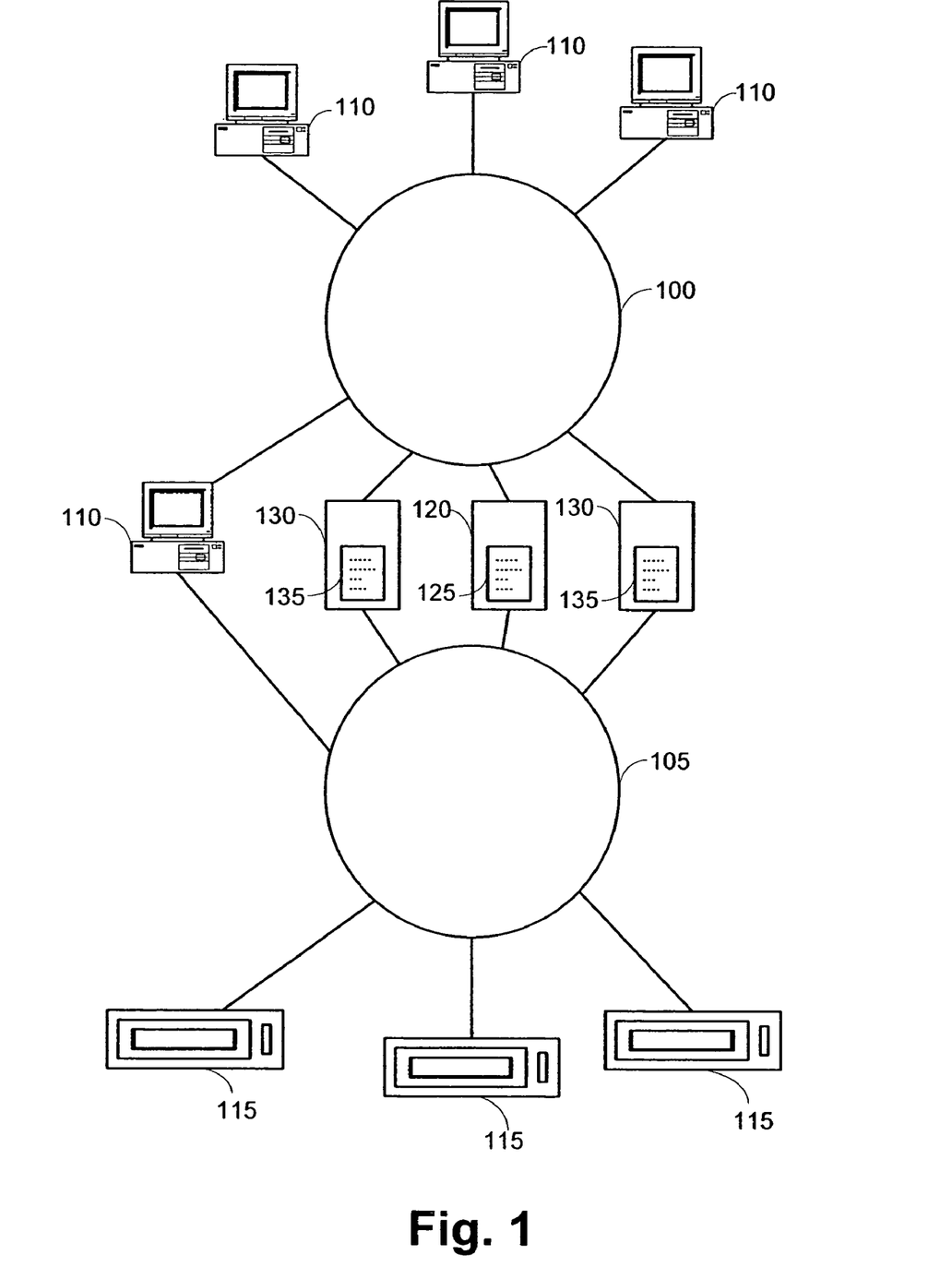
FIG. 1 is block diagram showing a high-level view of the network architecture and components of one possible embodiment of the invention.

Preferred embodiments of the invention are now described with reference to the drawings. An embodiment of the system of the present invention is shown in FIG. 1. As shown, the system includes a Local Area Network 100 and a Storage Area Network 105. The LAN will typically use 10/100 mbps Ethernet or other similar cable and communicate using TCP/IP. The SAN will typically use higher-bandwidth cabling such as a fiber channel and will use a different network communication protocol such as SCSI-3, CommVault Systems' DataPipe™, or other similar protocol optimized for network storage and retrieval of electronic data.

Network clients 110 are connected to the LAN 100 and in some embodiments also connected to the SAN 105. These network clients 110 contain the electronic data that the will travel over the network and be stored on or retrieved from the storage devices 115 attached to the SAN 105. The storage devices 115 may be tape drives, optical libraries, RAID, CD-ROM jukeboxes, or other storage devices known in the art.

A storage manager computer 120 is connected to both the LAN 100 and the SAN 105. Storage Management Software (SMS) 125 designed to direct the high level operations of the invention also resides on the storage manager computer 120. This storage management software 125 communicates with storage controller computers 130 and manages which Device Management Software 135 instance on which storage controller computer 130 shall control or own a particular storage device 115 at a given instance.

Figure 2:
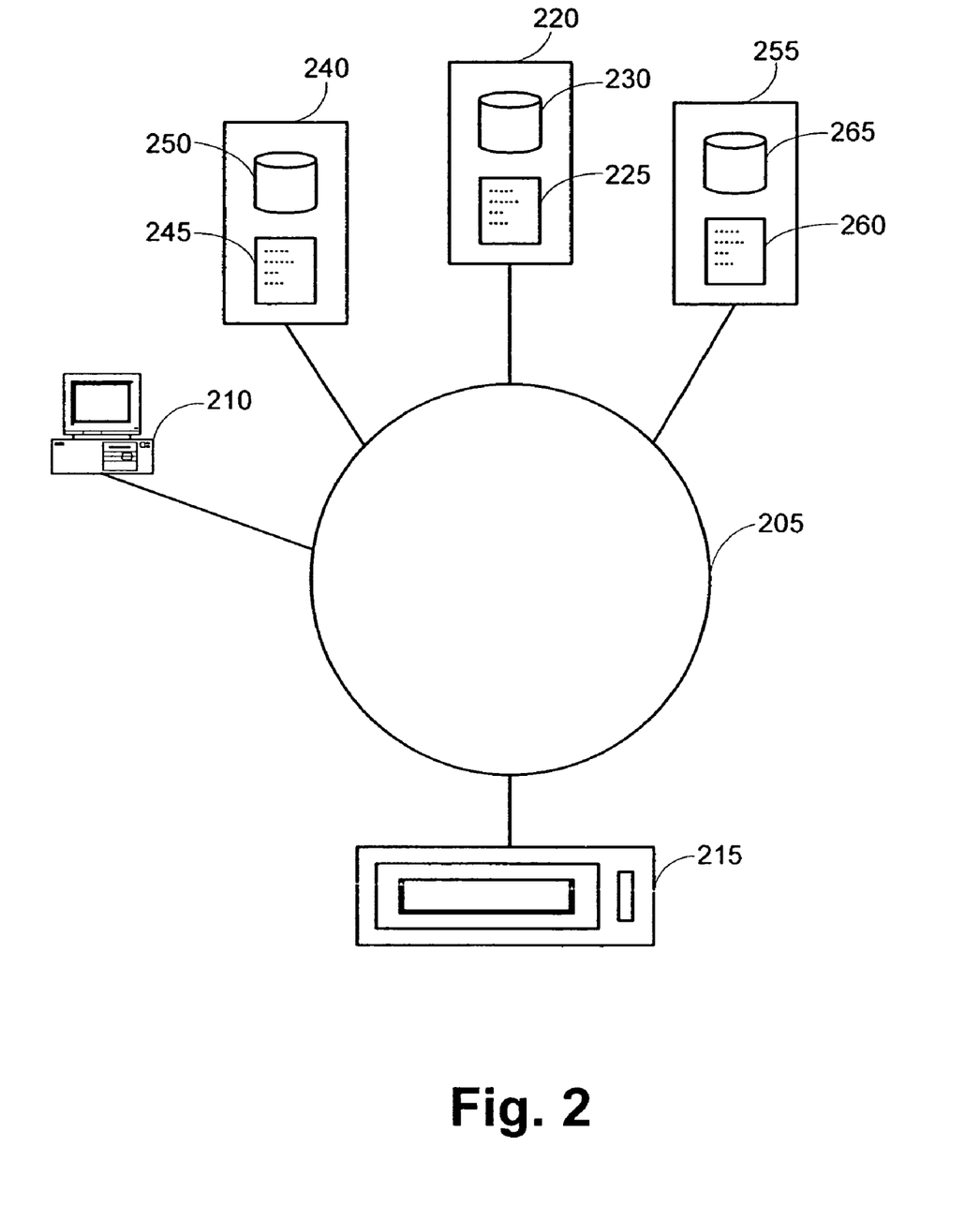
FIG. 2 is a block diagram showing the SAN-related components of a simplified embodiment of the invention.

FIG. 2 shows a more detailed view of the SAN-related components of the invention. The SAN 205 is the primary pathway for transport of electronic data to and from client computers 210, one of which is shown, and storage devices 215, one of which is shown. In this embodiment, the client computer 210 is connected to the SAN, but those skilled in the art will recognize that the client computer 210 could also be connected only to a LAN, WAN, or other type of computer network with minimal reconfiguration of the invention.

When the client computer 210 needs to transfer or retrieve electronic data from a storage device 215 on the SAN 205, a request to access the storage device 215 is passed from the client computer 210 to the storage controller computer 240, 255. The storage controller computer 240, 255 then contacts the storage manager computer 220 to request access to the storage device 215 requested by the client computer 210. Alternatively, in some embodiments the client computer 210 may directly communicate the access request to the storage manager computer 220. The storage manager computer 220 contains Storage Management Software 225 which controls the overall flow of operations pertaining to storage and retrieval of electronic data from storage devices on the SAN to which the storage manager computer is connected.

The storage manager computer 220 also has a database 230, table, or other data structure which contains information useful in managing the flow of electronic information to and from the various storage devices 215 on the SAN 205. In this embodiment, for example, there is a first storage controller computer 240 and a second storage controller computer 255. The storage manager computer 220 storage management database 230 contains information detailing which storage controller computer 240/255 controls a storage device 215 at a given instance. The storage management database 230 also contains information regarding the logical network pathway or access route to each storage device 215 on the SAN 205.

The first storage controller computer 240 contains a DMS instance 245 and a related storage controller database 250, table or other data structure containing useful information regarding the first storage controller computer 240 and any storage device 215 which it controls. The second storage controller computer 255 contains a Device Management Software instance 260 and a related storage controller database 265, table or other data structure containing useful information regarding the second storage controller computer 255 and any storage device 215 which it controls. Information stored in the storage controller databases 250 and 265 of the first storage controller computer 240 and the second storage controller computer 255 respectively, includes the network pathways to the storage device 215 being controlled and whether the respective DMS instance 245 and 260 is active or deactivated with respect to control of any given storage device 215.

Figure 3:
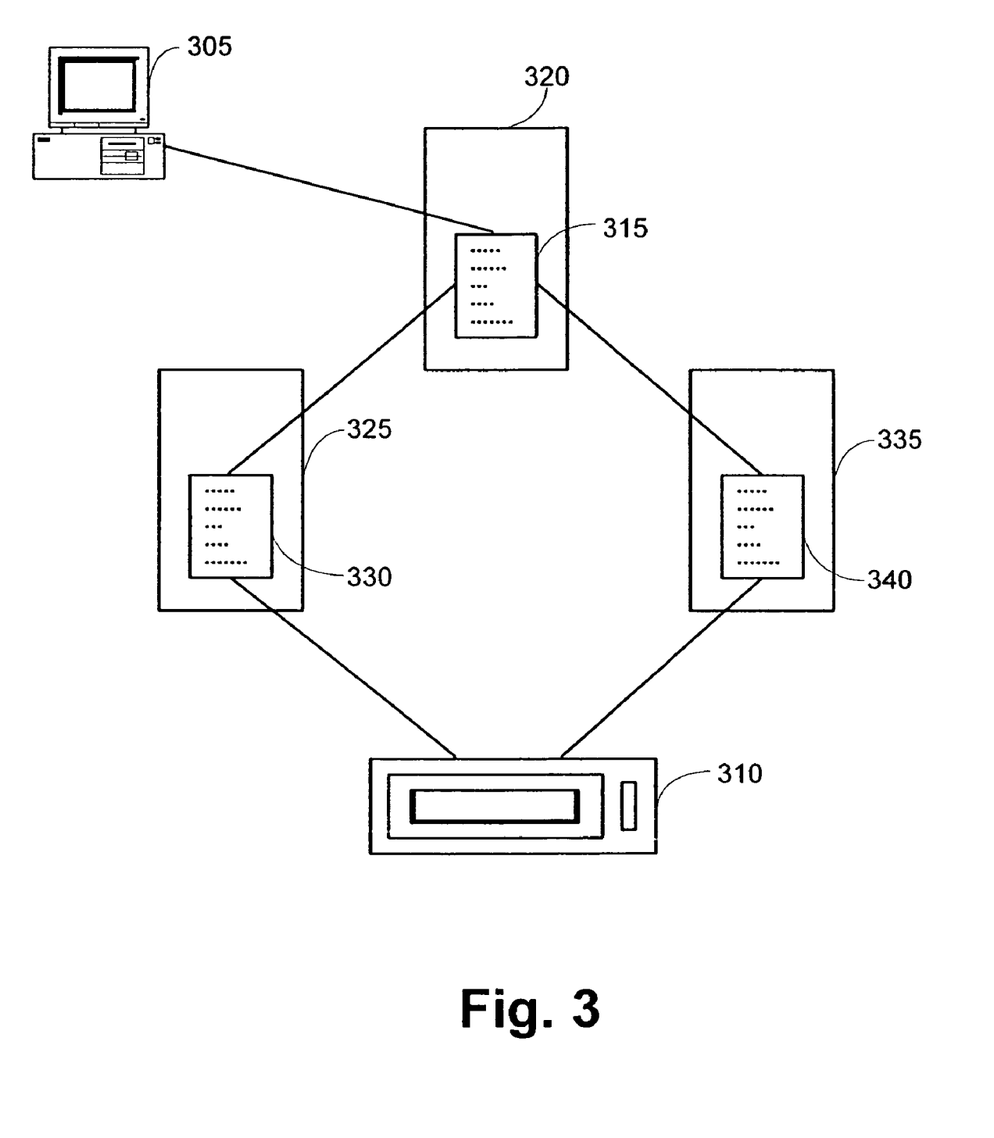
FIG. 3 is a block diagram showing an abstracted or logical view of two DMS's relationship to a given storage device in one possible embodiment of the invention.

FIG. 3 shows an abstracted or logical view of the relationship between two DMSs and a given storage device. In this simplified view, there is a first storage controller computer 325 with a DMS instance 330 and a second storage controller computer 335 with a DMS instance 340. When a client computer 305 needs to transfer or retrieve electronic data from a storage device 310, the client computer 305 first communicates this request with a storage controller software instance 330, 340 located on a storage controller computer 325, 335. The client computer 305 decides which storage controller computer 325, 335 to contact based on the type of data that is being stored or retrieved. Data is associated with a particular storage controller computer 325, 335 when the system is configured. All future requests pertaining to storage and retrieval of that data are then passed from the client computer 305 to the appropriate storage controller computer 330, 340. The storage manager computer 320 directs the high-level operations of the invention with respect to electronic information storage and retrieval procedures. As previously discussed, in some embodiments, the client computers 305 directly communicate access requests to the storage manager computer 320.

Since only one DMS can control the storage device 310 at any given time, the storage manager software 315 directs which DMS instance 330, 340 is in control of the storage device 310 at any given time. If the first DMS 330 is in control of the storage device 310, then the SMS 315 deactivates the second DMS 340 with respect to control of the storage device 310. Conversely, if the second DMS 340 is in control of the storage device 310, then the SMS 315 deactivates the first DMS 330 with respect to control of the storage device 310. Regardless of the actual physical connections described in FIG. 1 and FIG. 2, the storage device 310 is logically connected to and controlled by both the first DMS instance 330 and the second DMS instance 340 as if the storage device 310 were a mere external storage device directly connected to a storage controller computer in a traditional LAN storage architecture. This process if more fully explained below according to the flow diagram depicted in FIG. 4.

Figure 4:
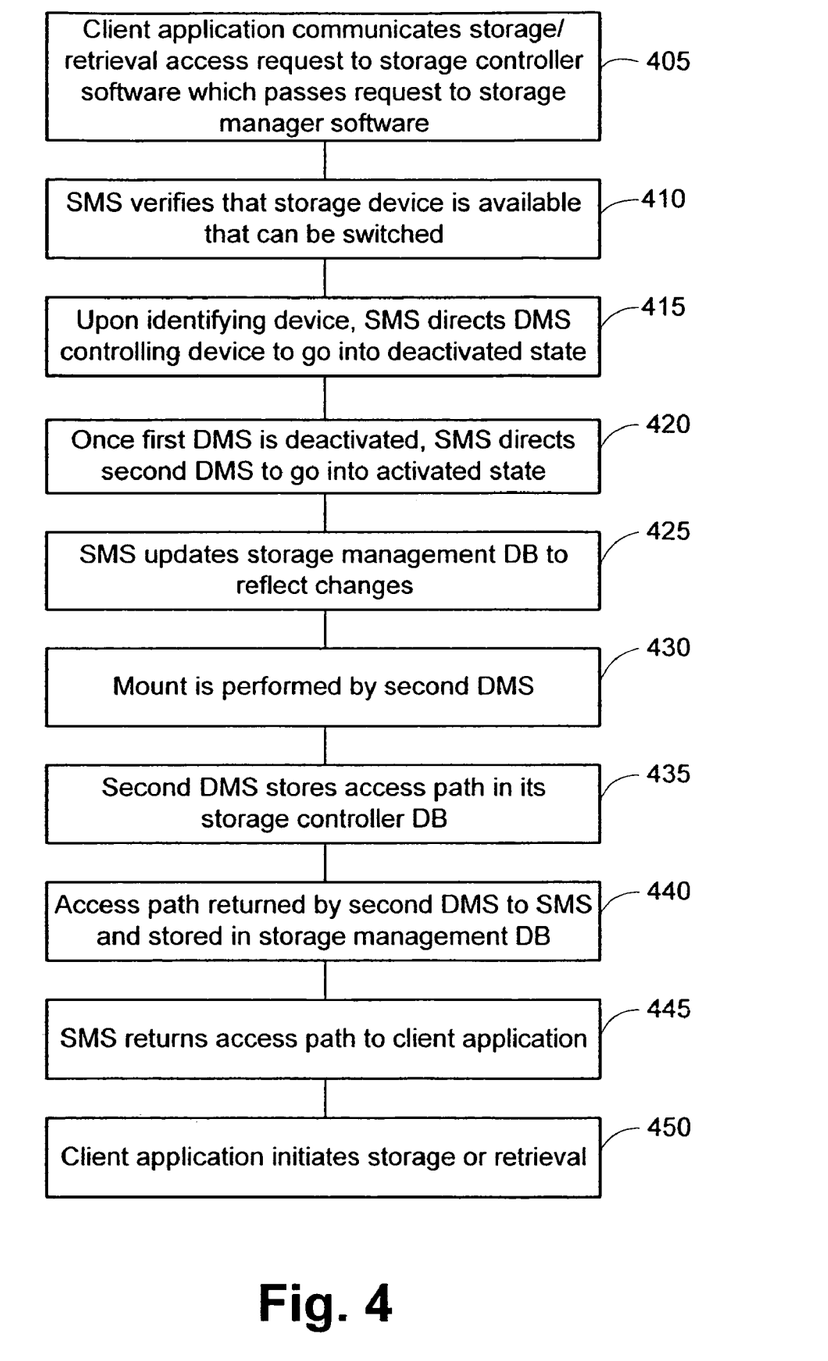
FIG. 4 is a flow diagram presenting a method to achieve dynamic device pooling in one embodiment of the present invention.

FIG. 4 is a flow diagram showing how dynamic device pooling is accomplished in one embodiment of the invention. A client application initiates a request to the storage controller software to store or retrieve electronic data from a storage device on the network and the storage controller software passes this request to the storage manager software by requesting access to a storage device, step 405. When the client computer is configured, data that is to be stored and retrieved is associated with a particular storage controller computer software instance. When that data must be stored or retrieved in the future, the client computer passes these requests on to the storage controller computer. The storage controller computer associates that data with a particular media group which is a collection of tapes or other storage media used by a drive pool. Using dynamic device sharing, the storage controller computer can store and retrieve data among multiple tapes in a media group spanning multiple drive pools if necessary.

When the client application request is received from the storage controller software, the SMS first verifies that a storage device is available that can be switched to accommodate the request, step 410. The SMS maintains a storage management database, table, or other data structure populated with information about the available storage devices and their respective storage controller computers. Access paths across the network to storage controller computers and then on to their appurtenant storage devices are also stored in this database.

Upon identifying an appropriate storage device, the SMS directs the DMS currently controlling the storage device to go into a deactivated state with respect to that storage device, step 415. Even though there are multiple DMSs executing on various hosts for the same storage device, the relationship is static and only one of them can control a storage device at a given instant. The other DMSs are said to be in a deactivated state with respect to that storage device.

The deactivated DMSs run a listening process waiting for a message from the SMS directing them to become active. Once the first DMS has been deactivated with respect to the storage device, the SMS communicates with the listening process of a second DMS on which the storage device will be mounted to change from a deactivated state to an activated state with respect to that storage device, step 420. At this point, the SMS also updates its storage management database to reflect that control of the storage device has been shifted from the first DMS to the second DMS and that the first DMS is now deactivated and that the second DMS is now activated with respect to that storage device, step 425.

The second DMS communicates with the storage device and executes procedures necessary to mount the storage device to the second DMS, step 430. Once the mount is performed, the storage device is logically connected to the second DMS computer and this access path is stored by the second DMS in its storage controller database, step 435. The DMS stores the access path to the storage device in its storage controller database because a storage device connected to multiple DMS storage controller computers may have multiple access paths. Mounting the storage device to the DMS computer and the resultant access path produced is in large part related to the hardware configuration of the DMS. The DMS is best-suited to store and delegate management of the access path to the storage device it controls. The alternative is to have the storage management computer store and track the individual hardware configurations of all the network DMS computers in the SMS storage management database and then pass the resultant access paths to the network storage devices on to the DMS computers when necessary.

Once the DMS has completed the mount of the storage device and stored the access path to the storage device in its own storage controller database, then the access path to the storage device is returned by the DMS to the SMS where it is also stored in the storage management database of the SMS for future recall, step 440. While a DMS communicates with storage devices, the SMS communicates with client applications. The SMS now returns this storage device access path to the client application that initially requested access to the storage device, step 445. The client application is then free to initiate storage or retrieval as appropriate, step 450.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to generally input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for allocating control of storage media, the system comprising:
    storage media;
    a first module configured to direct storage operations performed by the storage media;
    a second module configured to direct storage operations performed by the storage media; and
    a third module configured to, based upon a request from a client component for access to the storage media, direct the first module to assume an inactive state with respect to control of the storage media and to direct the second module to assume an active state with respect to control of the storage media,
    wherein at least one of the first and second modules is configured to generate path data indicating a network path to the storage media.

2. The system of claim 1, wherein the first and second modules comprise, respectively, first and second software modules.

3. The system of claim 2, wherein the first software module executes on a first computer and the second software module executes on a second computer.

4. The system of claim 3, wherein the first software module is configured to mount the storage media to the first computer, and wherein the second software module is configured to mount the storage media to the second computer.

5. The system of claim 1, wherein the storage media comprises a set of media having a plurality of tapes spanning one or more drive pools.

6. The system of claim 1, wherein each of the first and second modules, when in an inactive state, is configured to execute a listening process for detecting communication from the third module to assume an active state with respect to the storage media.

7. The system of claim 1, wherein the first and second modules are associated, respectively, with first and second databases, wherein each of the first and second databases is configured to store the path data.

8. The system of claim 7, wherein the third module is associated with a third database for storing information relating to which of the first and second modules is controlling the storage media.

9. The system of claim 1, wherein the third module is further configured to assign control of the storage media to another module if the first module becomes unavailable.

10. The system of claim 1, wherein each of the first and second modules is configured to allocate control of the storage media based at least in part on a priority of one or more of the storage operations.

11. A system for allocating control of a storage device, the system comprising:
    means for storing data;
    first means for controlling storage operations performed by said storing means, said first controlling means further configured to receive a request from a client component for access to said storing means;
    second means for controlling storage operations performed by said storing means; and
    means for directing said second controlling means to assume an inactive state with respect to control of said storing means and for directing said first controlling means to assume an active state with respect to control of said storing means,
    wherein said first controlling means is further configured to generate path data indicating a network path to said storing means.

12. The system of claim 11, wherein said directing means comprises means for storing data identifying which of the first and second controlling means is in an active state.

13. The system of claim 11, wherein each of said first and second controlling means is configured to allocate control of the storing means based at least in part on a priority of one or more of the storage operations.

* * * * *

UNITED STATES PATENT AND TRADEMARK OFFICE
CERTIFICATE OF CORRECTION

PATENT NO.         : 7,409,509 B2
APPLICATION NO.    : 11/582152
DATED              : August 5, 2008
INVENTOR(S)        : Devassy et al.

It is certified that error appears in the above-identified patent and that said Letters Patent is hereby corrected as shown below:

On the Title Page, Item (75) on the first page, please delete "Raji" and insert -- Rajiv --, therefor.

Signed and Sealed this

Twenty-fourth Day of February, 2009

JOHN DOLL
*Acting Director of the United States Patent and Trademark Office*